Patented Nov. 25, 1941

2,263,948

UNITED STATES PATENT OFFICE 2,263,948

GERMICIDAL DETERGENT

Halvor O. Halvorson, Minneapolis, Minn., Erling J. Ordal, Seattle, Wash., and John L. Wilson, St. Paul, Minn., assignors to Economics Laboratory, Inc., St. Paul, Minn., a corporation of Delaware No Drawing. Application October 31, 1938, Serial No. 238,062

15 Claims. (Cl. 167—18)

This invention relates to improved germicidal detergents.

The new and improved germicidal detergents of the present invention include a wetting agent or agents, buffer or alkaline salts, and a chlorine disinfecting compound, particularly an organic chlorine disinfecting compound, in such proportions that when, for example, a solution is made of the composition containing from ½ to 3% of the composition, the solution will be an effective germicidal detergent and the wetting agent and the chlorine disinfecting compound will each form but a small fraction of 1% of the solution.

The term "wetting agent" as used herein is intended to designate those sulfonated or sulfated products such as sulfonated hydrocarbons, sulfated or sulfonated higher alcohols, and sulfonated or sulfated fatty oils and fatty acids and esters thereof, which are free from carboxyl groups, whether free or neutralized, or which have carboxyl groups blanked or made ineffective in a suitable manner, as by substituting for the hydrogen of the carboxyl group an alkyl group, or an amido group, or other suitable group and which do not form objectionable precipitates with calcium and magnesium ions, found in hard water, as distinguished from ordinary soaps, which are neutralized carboxyl acids and which from objectionable precipitates with calcium and magnesium ions present in hard water.

By the term "chlorine disinfecting compound," is meant a chlorine containing compound which in water furnishes available chlorine and which is a disinfecting compound because of this liberation of available chlorine. Chlorine compounds of the nature described in the Schmelkes Patent 1,958,370, and defined therein as N-chloro derivatives of the oxidant in a redox system, and particularly N-N-dichloro-azo-dicarbonamidine, have important advantages for use in the present invention.

The sulfated or sulfonated wetting agents, when used along with the buffer or alkaline salts and the chlorine disinfecting compounds exert a synergistic or activating effect on the chlorine disinfecting compounds, such that a solution containing the wetting agent, the buffer or alkaline salts, and the chlorine disinfecting compound has a greater germicidal action than the sum of the germicidal action of the individual constituents. In the compositions of the invention, the detergent properties are due largely to the buffer or alkaline salts, the sulfated or sulfonated wetting agents being present in a very minor proportion; their major function being to activate or synergize the chlorine disinfecting compound so that the amount of such compound may be much less than would be required in the absence of the wetting agent to produce a germicidal product.

The alkalinity of solutions containing from ½ to 3% of the new composition may be varied over a relatively wide range, for example from a pH of a little above 7.0 to as high as 12.0; but in general it is advantageous to use compositions which produce solutions having a pH ranging from about 10 to about 11, as such solutions have excellent detergent properties and do not have the objections of highly caustic solutions. Furthermore, with many of the chlorine disinfecting compounds, and particularly with azochloramide (N-N-dichloro-azo-carbonamidine) the synergistic or activating effect of the wetting agent is most marked at about this pH range.

The buffer or alkaline salts which are used in the new compositions of the invention are the alkali metal alkaline salts, such as the sodium carbonates, phosphates or silicates, etc., used in such amounts as to impart the desired pH to solutions of the composition and to give effective detergent action when the compositions are dissolved in water in a concentration of from about ½ to 3%. In using the buffer salts, in making the new compositions, the desired pH and the desired detergent properties may, in some cases, be obtained by the employment of a single buffer salt, such as sodium carbonate, or mixtures of salts of the same acid, such as sodium carbonate and sodium bicarbonate, or salts of different acids, such as mixtures of sodium carbonate and sodium silicate, or sodium carbonate and sodium phosphate. Thus the buffer or alkaline salts may consist of mixtures of various phosphates and carbonates, or phosphates and silicates, or carbonates and silicates, or phosphates, carbonates and silicates, as well as mixtures of various phosphates alone, or silicates alone, etc. Other salts besides phosphates, carbonates and silicates may, of course, be used. The selection of alkaline or buffer salts, or mixtures of alkaline salts to produce detergent compositions is well known, and requires no further explanation here.

The wetting agents which are used in the new compositions are the sulfonated or sulfated wetting agents, including the aromatic sulfonates, the alkyl aryl sulfonates, the sulfonated or sulfated fatty oils or fatty acid esters, the sulfated alcohols, the ligno-sulfonates, sulfonated or sulfated derivatives of fatty acid amides, sulfonated mineral oils, hydrogenated aryl sulfonates, etc. In general, these materials are characterized by having a sulfonate or sulfate group, and by freedom from carboxylic acid groups either free or neutralized, as distinguished from blocked, as by an ester or amido group. Alkyl naphthylene sulfonates and alkyl aryl sulfonates are marketed under various trade names, such as the Nekals, the Alkanols, the Areskets, the Areskaps, the Aresklenes, and the Nacconols. Sulfonated and sulfated vegetable and animal oils are marketed as Turkey-red oil, Monopole soap, Avirol KM Extra, Presbit Oil U, etc. These are ordinarily sulfated products. More drastically treated vegetable or animal oils, containing both sulfate and sulfonate groups, are marketed as Enterol and Intrasol. Sulfated fatty acids with the carboxylic acid group blocked, as with an alkyl group to form the organic acid ester, are marketed as Avirol AH Extra (the sodium salt of the sulfuric acid ester of butyl ricinoleic ester). Sulfated fatty acid amides are marketed under the trade name Humectol C., which is the sodium salt of the sulfuric acid ester of oleic acid amide. Sulfonated mineral oils are marketed under various designations, including the trade name Universal Oil BP 200, and Epifosal. Aryl sulfonates, such as naphthylene sulfonates are marketed under various trade names, including Parasanol. Hydrogenated aryl sulfonates are also marketed under various trade names. For example, Alkanol S, which is sodium tetralin sulfonate. Sulfated (sulfonated) aliphatic alcohols are widely marketed under a number of trade names. The primary alcohol derivatives are sold under such trade names as Gardinols, Brilliant Avirols, Dupenols, Ocenol Sulfate, Lorol Sulfate, Orvus and Dreft. Sulfates of secondary alcohols are marketed under the trade name of Tergitols. An oleic acid derivative of isethionic acid is marketed under the trade name Igepon A. The sodium salt of abietene sulfonic acid is marketed under the trade name Neopin SS.

In general, the amount of the wetting agent which will be used in the new compositions will be but a small proportion of the whole, such that when the compositions are dissolved in water in concentrations ranging from ½ to 3%, the wetting agent will constitute but a small fraction of 1% of the solution. The chlorine disinfecting compound is used in similar quantities, and in the germicidal detergent solution used, will be present in an amount corresponding to but a small fraction of 1%, and, in general, in such amounts that in the absence of the wetting agent, the solution would not be actively germicidal.

The new compositions are advantageously compounded and marketed as dry compositions, in the form of dry powders, containing the various ingredients in the form of an intimate and homogeneous admixture, such that a definite weight of the powder may be used to give a solution of definite strength or definite proportions of the different ingredients. Such a dry mixture is readily prepared, handled, shipped and stored, and when used in definite amounts in forming solutions, insures the production of proper germicidal detergent solution.

In testing the solutions of the new compositions, the following test has been used:

The dry mixture, containing the ingredients of the composition, is made into a solution of from ½ to 1% strength. To 5 cc. of this solution is added ½ cc. of a 24 hour culture of the standard test organism, *Staphylococcus aureus* (Insecticide Board strain). Before the culture is added to the test solution, it is brought to the required temperature, which in these tests has been 37° C. or such other temperature as is indicated. After the culture has been in the test solution for 5 minutes, a 4 mm. loopful is removed and added to a tube of molten agar at a temperature of 45° C. and the mixture poured into a Petri plate and incubated for 48 hours, at the end of which time a count is made of the colonies appearing on the plate. The number of organisms originally added to the test solution is in the neighborhood of 500 millions. If no organisms are killed, the loopful removed will contain in excess of 10,000 organisms, and therefore the number of colonies appearing on the plate will be in excess of 10,000. If some of the organisms are killed, the number of colonies appearing on the plate will be less than 10,000. In the data reported in the following examples, the numbers indicate the colonies appearing on the test plate after 48 hours of incubation.

The invention will be illustrated by the following examples:

Compositions were made up containing commercial sodium sesquicarbonate, azochloramide and various commercial sulfated or sulfonated wetting agents, the proportion of the buffer salts being such as to give a pH of about 9.7 in 1% solutions of the compositions. In the solutions tested, the proportion of the buffer salts, azochloramide and wetting agents was as shown in the following table, which gives the results of tests carried out at a temperature of 37° C. with *Staphylococcus aureus*, as described above.

*Activation of azochloramid by various commercial wetting agents*

Organism: *Staph. aureus*, temperature: 37° C.
Buffer: Commercial sodium sesquicarbonate—Na₂CO₃NaHCO₃·2H₂O.

| Solution tested | Plate counts | |
|---|---|---|
| | 5 min. | 10 min. |
| 0.95% buffer | 10,000+ | 10,000+ |
| .0035% Azochloramid | 10,000+ | 5,000 |
| 0.95% buffer+0.0035% Azochloramid | 1,500 | 90 |
| 0.90% buffer+0.0035% Azochloramid+0.10% Alkanol B | 80 | 1 |
| 0.95% buffer+0.0035% Azochloramid+0.05% Alkanol B | 110 | 4 |
| 0.90% buffer+0.0035% Azochloramid+0.10% Alkanol PF | 100 | 1 |
| 0.95% buffer+0.0035% Azochloramid+0.05% Alkanol PF | 225 | 13 |
| 0.90% buffer+0.0035% Azochloramid+0.10% Alkanol SA | 100 | 0 |
| 0.95% buffer+0.0035% Azochloramid+0.05% Alkanol SA | 300 | 5 |
| 0.90% buffer+0.0035% Azochloramid+0.10% Areskap 100 | 70 | 0 |
| 0.95% buffer+0.0035% Azochloramid+0.05% Areskap 100 | 125 | 4 |
| 0.90% buffer+0.0035% Azochloramid+0.10% Aresket | 100 | 3 |
| 0.95% buffer+0.0035% Azochloramid+0.05% Aresket | 150 | 2 |
| 0.90% buffer+0.0035% Azochloramid+0.10% Aresklene 400 | 8 | 0 |
| 0.95% buffer+0.0035% Azochloramid+0.05% Aresklene 400 | 125 | 0 |
| 0.90% buffer+0.0035% Azochloramid+0.10% Nacconol KPR | 2 | 0 |
| 0.95% buffer+0.0035% Azochloramid+0.05% Nacconol KPR | 18 | 0 |
| 0.90% buffer+0.0035% Azochloramid+0.10% Nekal AEM | 300 | 35 |
| 0.95% buffer+0.0035% Azochloramid+0.05% Nekal AEM | 900 | 30 |
| 0.90% buffer+0.0035% Azochloramid+0.10% Nekal BX dry | 90 | 0 |
| 0.95% buffer+0.0035% Azochloramid+0.05% Nekal BX dry | 250 | 2 |
| 0.90% buffer+0.0035% Azochloramid+0.10% Neopen SS | 125 | 9 |
| 0.95% buffer+0.0035% Azochloramid+0.05% Neopen SS | 250 | 5 |
| 0.90% buffer+0.0035% Azochloramid+0.10% Orvus | 50 | 0 |
| 0.95% buffer+0.0035% Azochloramid+0.05% Orvus | 160 | 0 |
| 0.90% buffer+0.0035% Azochloramid+0.10% Igepon AP | 300 | 2 |
| 0.95% buffer+0.0035% Azochloramid+0.05% Igepon | 300 | 20 |

| Controls | Plate counts | |
|---|---|---|
| | 5 min. | 10 min. |
| 1/90 phenol | 175 | 7 |
| 1/100 phenol | 500 | 125 |

Solutions of the buffer salts and wetting agents in the concentrations outlined above, without the azochloramide, gave plate counts of 10,000 or more, except for the Nacconol KPR, which, in admixture with the buffer salts, gave counts of 3,000 or more. From this table it will be noted that the buffer salts alone, the buffer salts and wetting agent alone, and the buffer salts and azochloramide alone were not effective germicidally, and that the germicidal effectiveness of the azochloramide in admixture with the buffer was radically increased by the presence of the wetting agent. The two phenol solutions are included for purposes of comparison, as controls.

As further illustrating the invention, tests were made on various buffer solutions together with an alkyl sulfate (sulfonated alcohol) and azochloramide in various concentrations. These tests were carried out in the same manner. The results are shown in the following table:

Activation of azochloramid with an alkyl sulfate (orvus)

Organisms: Staph. aureus, temperature: 37° C.
Buffers: I—1% solution of a mix of 50% $Na_2CO_3$ and 50% $NaHCO_3$, pH about 9.9.
II—1% solution of $Na_2CO_3$, pH about 11.5.
III—1% solution of $Na_2SiO_3H_2O$, pH about 12.6.

A. WITH BUFFER I, pH 9.9

|  | Plate counts | |
|---|---|---|
|  | 5 min. | 10 min. |
| Buffer alone | 10,000+ | 10,000+ |
| Buffer+0.04% Orvus | 9,000 | 6,000 |
| Buffer+0.0036% Azochloramid | 1,500 | 300 |
| Buffer+0.0036% Azochloramid+0.04% Orvus | 70 | 0 |
| Buffer+0.0018% Azochloramid | 5,000 | 1,000 |
| Buffer+0.0018% Azochloramid+0.04% Orvus | 300 | 30 |
| Buffer+0.0009% Azochloramid | 10,000 | 10,000 |
| Buffer+0.0009% Azochloramid+0.04% Orvus | 3,000 | 300 |

B. WITH BUFFER II, pH 11.5

|  | Plate counts | |
|---|---|---|
|  | 5 min. | 10 min. |
| Buffer alone | 10,000+ | 10,000+ |
| Buffer+0.04% Orvus | 3,500 | 1,200 |
| Buffer+0.0018% Azochloramid | 3,000 | 300 |
| Buffer+0.0018% Azochloramid+0.04% Orvus | 200 | 3 |

C. WITH BUFFER III, pH 12.6

|  | Plate counts | |
|---|---|---|
|  | 5 min. | 10 min. |
| Buffer alone | 10,000+ | 10,000+ |
| Buffer+0.04% Orvus | 800 | 125 |
| Buffer+0.0072% Azochloramid | 3,000 | 50 |
| Buffer+0.0072% Azochloramid+0.04% Orvus | 100 | 0 |
| Buffer+0.0036% Azochloramid | 8,000 | 200 |
| Buffer+0.0036% Azochloramid+0.04% Orvus | 100 | 0 |
| Buffer+0.0018% Azochloramid | 10,000 | 1,200 |
| Buffer+0.0018% Azochloramid+0.04% Orvus | 175 | 20 |

| Controls | Plate counts | |
|---|---|---|
|  | 5 min. | 10 min. |
| 1/90 phenol | 350 | 80 |
| 1/100 phenol | 250 | 70 |

It will be noted that the alkyl sulfate markedly increased the germicidal effectiveness of the solution.

A further series of tests were carried out to demonstrate the activation of solutions containing buffer salts and chloramine T or a hypochlorite with sodium lauryl sulfate. The results are shown in the following table.

Activation of chloramine T and of a hypochlorite solution with sodium lauryl sulfate Organism: Staph. aureus, temperature: 37° C.
Concentration of ingredients in test solutions
Buffer: 1% solution of sodium sesquicarbonate, pH about 9.9
Sodium lauryl sulfate: 0.1%
Chloramine T: 0.1%
Hypochlorite: HTH-15 (a commercial brand of a mixture of calcium hypochlorite and sodium carbonate which contains 15% available chlorine) made up in such strength that the test solutions contained 75 ppm. of available chlorine.

| Solution tested | Plate counts | |
|---|---|---|
|  | 5 min. | 10 min. |
| Buffer alone | 10,000+ | 10,000+ |
| Sodium lauryl sulfate alone | 10,000+ | 10,000+ |
| Chloramine T alone | 0 | 0 |
| Hypochlorite alone | 1,000 | 100 |
| Buffer+sodium lauryl sulfate | 4,000 | 1,500 |
| Buffer+chloramine T | 10,000 | 6,500 |
| Chloramine T+sodium lauryl sulfate | 0 | 0 |
| Buffer+chloramine T+sodium lauryl sulfate | 300 | 44 |
| Buffer+hypochlorite | 5,000 | 2,000 |
| Hypochlorite+sodium lauryl sulfate | 58 | 1 |
| Buffer+hypochlorite+sodium lauryl sulfate | 120 | 0 |

| Controls | Plate counts | |
|---|---|---|
|  | 5 min. | 10 min. |
| 1/90 phenol | 0 | 0 |
| 1/100 phenol | 60 | 3 |

In the foregoing test the proper comparison is between the solutions containing the chloramine T or hypochlorite and the buffer with solutions containing the chloramine T or the hypochlorite, the buffer and the sodium lauryl sulfate, as the tests with the chloramine T or hypochlorite alone are at a much lower pH value than is usable in most cleaning operations. In this connection, it must be borne in mind that the present invention relates to detergent solutions which are germicidal, and not to simple germicidal solutions. It will be noted that the sodium lauryl sulfate markedly increases the effectiveness of the chloramine T and the hypochlorite in solutions containing the buffer salts.

The new compositions are useful for many purposes, such as in hospitals or similar institutions, as well as in hotels and restaurants for dish washing and other purposes, and in various industries such as the beverage and dairy industries where, for example, the washing and sterilizing of bottles and containers is important.

We claim:

1. A germicidal detergent composition comprising buffer salts, a chlorine disinfecting compound, and a wetting agent as herein defined, said composition being soluble in water, and a solution made therefrom, containing from ½ to 3% of the composition, containing only a small fraction of 1% of the wetting agent and the chlorine disinfecting compound, being an actively germicidal detergent solution.

2. A germicidal detergent composition in the form of a dry mixture of buffer salts, a chlorine disinfecting compound and a wetting agent as herein defined, the composition being made up for the most part of buffer salts and containing a relatively smaller amount of the wetting agent and the chlorine disinfecting compound, the composition being adapted, when dissolved in water, to form a solution containing from around ½ to 3% of the composition, to give an active germicidal detergent composition.

3. A germicidal detergent composition comprising buffer salts, a sulfonated hydrocarbon wetting agent and a chlorine disinfecting compound, said composition being soluble in water and being adapted, when dissolved in water to form a solution containing from around ½ to 3% of the composition, to give an active germicidal detergent solution.

4. A germicidal detergent composition in the form of a dry mixture of buffer salts, a chlorine disinfecting compound and an alkyl sulfate wetting agent, the composition being made up for the most part of buffer salts, and containing a relatively smaller amount of the chlorine disinfecting compound and the alkyl sulfate, the composition being adapted, when dissolved in water to form a solution containing from around ½ to 3% of the composition, to give an active germicidal detergent solution.

5. A germicidal detergent composition comprising buffer salts, a chlorine disinfecting compound and an aromatic sulfonate, said composition being soluble in water and a solution made therefrom, and containing from ½ to 3% of the composition, containing only a small fraction of 1% of the chlorine disinfecting compound and the aromatic sulfonate, being an active germicidal detergent solution.

6. A germicidal detergent composition comprising buffer salts, a chlorine disinfecting compound and an alkyl aryl sulfonate, said composition being soluble in water and a solution made therefrom, and containing from ½ to 3% of the composition, containing only a small fraction of 1% of the chlorine disinfecting compound and the alkyl aryl sulfonate, being an active germicidal detergent solution.

7. A germicidal detergent composition comprising buffer salts, a chlorine disinfecting compound and a sulfated fatty oil, said composition being soluble in water, and a solution made therefrom, and containing from ½ to 3% of the composition, containing only a small fraction of 1% of the sulfated fatty oil and the chlorine disinfecting compound and being an active; germicidal detergent solution.

8. Compositions as in claim 1, in which the chlorine disinfecting compound is an N-chloro derivative of the oxidant in a redox system.

9. Compositions as in claim 1, in which the chlorine disinfecting compound is azochloramide.

10. Compositions as in claim 4, in which the chlorine disinfecting compound is an N-chloro derivative of the oxidant in a redox system.

11. Compositions as in claim 6, in which the chlorine disinfecting compound is an N-chloro derivative of the oxidant in a redox system.

12. Compositions as in claim 4, in which the chlorine disinfecting compound is azochloramide.

13. Compositions as in claim 6, in which the chlorine disinfecting compound is azochloramide.

14. Compositions as in claim 3, in which the chlorine disinfecting compound is an N-chloro derivative of the oxidant in a redox system.

15. Compositions as in claim 3, in which the chlorine disinfecting compound is azochloramide.

HALVOR O. HALVORSON.
ERLING J. ORDAL.
JOHN L. WILSON.

---

CERTIFICATE OF CORRECTION.

Patent No. 2,263,948.            November 25, 1941.

HALVOR O. HALVORSON, ET AL.

It is hereby certified that error appears in the printed specification of the above numbered patent requiring correction as follows: Page 1, first column, line 28, for "carboxyl" read --carboxylic--; and line 29, for the word "from" read --form--; page 3, first column, line 27, for "$Na_2SiO_3H_2O$" read --$Na_2SiO_3 5H_2O$--; and that the said Letters Patent should be read with this correction therein that the same may conform to the record of the case in the Patent Office.

Signed and sealed this 3rd day of March, A. D. 1942.

Henry Van Arsdale,
(Seal)            Acting Commissioner of Patents.

CERTIFICATE OF CORRECTION.

Patent No. 2,263,948. November 25, 1941.

HALVOR O. HALVORSON, ET AL.

It is hereby certified that error appears in the printed specification of the above numbered patent requiring correction as follows: Page 1, first column, line 28, for "carboxyl" read --carboxylic--; and line 29, for the word "from" read --form--; page 3, first column, line 27, for "$Na_2SiO_3H_2O$" read --$Na_2SiO_3 5H_2O$--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.